UNITED STATES PATENT OFFICE.

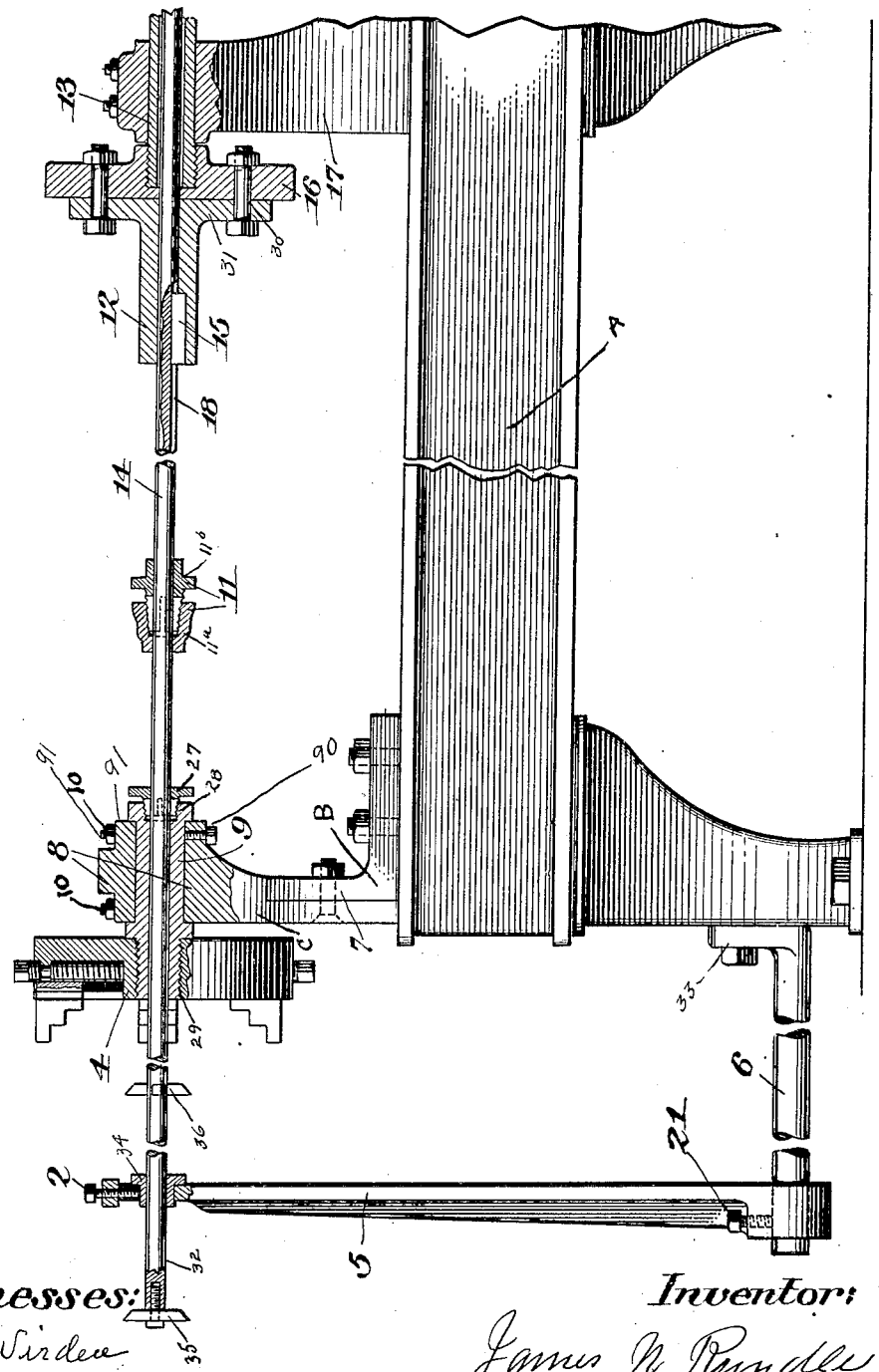

JAMES N. RUNDLE, OF OXNARD, CALIFORNIA.

BORING ATTACHMENT FOR LATHES.

No. 926,612.   Specification of Letters Patent.   Patented June 29, 1909.

Application filed May 25, 1907. Serial No. 375,743.

*To all whom it may concern:*

Be it known that I, JAMES N. RUNDLE, a citizen of the United States, residing at Oxnard, county of Ventura, and State of California, have invented certain new and useful Improvements in Boring Attachments for Lathes, of which the following is a specification.

This invention relates to lathes, or turning lathes, and it has for its object to provide improvements in or attachable to lathes, whereby the range of work of which the same is ordinarily capable may be widened and extended, capacitating such machines for handling work otherwise and commonly impossible, which improvements will be relatively simple and inexpensive in construction and provision, positive in operation, convenient in use and adjustment, and generally superior in point of efficiency and serviceability.

The invention consists of the novel provision, combination, association and construction of parts, members and features, all as hereinafter described, as shown in the drawing, and as finally pointed out in the claims.

In the drawing, which is a fragmentary front elevation of a turning-lathe, centrally broken away and partly shown in section for clearness of illustration, the improvements constituting the invention being shown as combined with the general primary lathe elements or members, and in which reference characters are used to designate the several parts of the construction.

A designates the bed of the lathe, carrying the adjustable tail block B which supports a bearing block C by an adjustable connection, as at 7. Rotatably mounted in the bearing block C, is a hollow or dead spindle 9, over which extends a cap piece 8 provided with tightening bolts 10. The boring bar 14 is adapted to slide freely through and revolve within the hollow spindle 9, the latter being held stationary by screw 90 and flanges 91 abutting against the cap piece 8; or the hollow spindle 9 may be made to revolve with the boring bar, the screw 90 being loosened therefrom, by means of a tapered and slotted externally threaded lock-nut 27 mounted upon the boring bar and fitting similar internal threads upon a corresponding tapered portion 28 of the hollow spindle 9. The hollow spindle 9, out-board of the tail block B, is threaded as at 29 to fit the chuck 4 which holds the work. The hollow live spindle 13, adjacent to the head block 17, is screwed to a face plate 16, which is in turn bolted, as at 30, to the flanged end 31 of a cast sleeve 12, of any convenient length, which is bored to accommodate the boring bar 14, and to permit its slidable traverse and play through the hollow live spindle. The sleeve 12 is provided with a spline, feather or key 15, fitting a groove or key-way 18 formed longitudinally of the boring bar, whereby rotation of the live spindle 13 and sleeve 12 is transmitted to the boring bar, in its longitudinal adjustment or feed.

The boring bar may be held by a suitable tool held by the tool-holder post, which latter may be carried by the slide rest, and thus fed in either direction by the feed mechanism of the lathe, all of which is not shown, as being not a part of the invention. But to enable such feed of the boring bar, in either direction, I provide a collar 11, adjustable upon the boring bar, and comprising a female part $11^a$, internally threaded, and receiving a male part $11^b$, tapered, externally threaded and slotted. When these collar-parts are co-engaged at a predetermined point on the boring bar, the whole collar is locked to the latter; and the tool of the tool-holder post may be disposed between the collar-parts to obtain a feeding purchase upon the boring bar. I furthermore provide an out-board bearing for the boring-bar, or the tool or cutter bars, as 32, that may be secured to the same, such bearing comprising an upright arm 5 which is adjustably fitted, at its lower end, as at 21, to an extended bracket 6 adjustably connected with the lathe-frame, as at 33. Any one of a number of collars 34, bored to fit the boring bar or different sized tool or cutter bars 32, for connection therewith, may be fitted into the upper end of the arm 5 and held in place by a bolt 2. 35 designates a tool or cutter applied to the tool or cutter bar 32; and 36 designates a tool or cutter directly applied to the boring bar:— both out-board of the lathe.

The method of use, operation and advantages of the improvements herein-above described, will be readily understood from the foregoing, taken in connection with the drawing and the following statement:— When it is desired to operate upon a piece of work which can not be accommodated in-board of the tail block B because of its shape or bulk, a chuck 4, or other workholding device is connected with the hollow spindle 9, out-board of the tail-block, the cap piece 8 and screw 90 are loosened, the lock-nut 27 is tightly engaged with the threaded portion 28 of the hollow spindle 9, operatively connecting the boring bar 14 and said hollow spindle, and the live spindle 13 is put in motion to rotate the boring bar 14 and consequently the chuck 4 and the work therein, which may now be turned up. When the work has been trued up, so that a perfect operation of the tool or cutter may be obtained, the cap piece 8 and screw 90 are tightened upon the hollow or dead spindle 9, after the lock-nut 27 has been manipulated to disconnect the boring bar operatively from the hollow spindle 9, and the proper tool or cutter 35 or 36 is brought into operation upon the work, in direct connection with the rotating bar or in indirect connection therewith through the agency of a tool or cutter bar 32. The boring bar 14 now rotates independently of the fixed or dead hollow spindle 9. The boring bar, together with the tool or cutter, may be fed in either direction through the agency of the collar 11, the feed mechanism of the lathe, and suitable operative connections, such as the tool-holder post, a suitable tool held thereby and the slide rest, as herein above described. The spline, feather or key 15, fitting the groove or key-way 18, the sleeve 12, and the face plate 16, constitute operative connections between the boring bar and the live spindle 13, at all times effective.

As described, the cap piece 8 and the bolts 10 constitute means for permitting removal and the screw 90 means for holding the hollow or dead spindle 9 and the work against rotation; the lock-nut 27 constituting means for operatively connecting and disconnecting the boring bar and the hollow spindle 9.

When it is desired to operate upon a piece of work which can be accommodated in-board of the tail block B, the cap piece 8 is removed and the dead spindle 9 with its chuck reversed bodily end for end so that the chuck comes in-board, after which replacing of the cap piece holds the parts in position by engaging the flanges 91, and the screw 90 may be set up to hold the spindle 9 against rotation. The out-board bearing, comprising the arm 5 and its adjustable connection with the lathe-frame, gives supplementary out-board support for the boring bar or the tool or cutter bars, insuring alinement and true running outboard of the lathe.

The improvements are particularly advantageous in chucking, centering and boring out wheels and pulleys, and in turning work too large to swing over the bed of the lathe.

It will be noted that the several parts and members of the invention are very easily adjusted to adapt the improvements to varying requirements of service; and that the ordinary type of lathe may readily be transformed according to the objects of the invention, by the provision for it and combination with it of the parts, members and features requisite to practice the invention.

I do not desire to be understood as limiting myself to the specific construction, combination and association of parts, members and features described and illustrated; but reserve the right to vary the same, in adapting the improvements to varying conditions of use, without departing from the spirit of the invention or the terms of the following claims:—

Having thus disclosed my invention, I claim and desire to secure by Letters Patent:—

1. In a lathe, the combination with the head block and tail block, a live spindle in the former, a hollow spindle in the latter, and a chuck carried by one projecting end of this spindle; of means for permitting or for checking rotation of the hollow spindle in its block, a boring bar splined in and rotated by the live spindle and adapted to pass through the hollow spindle and chuck, means for operatively connecting and disconnecting the bar and hollow spindle, and means on the boring bar adapted to be engaged by the feed mechanism of the lathe for feeding the boring bar longitudinally.

2. In a lathe, the combination with the head block and tail block, a live spindle in the former, a hollow spindle in the latter, and a chuck carried by one projecting end of this spindle; of a screw through the tail block for permitting or for checking rotation of the hollow spindle in its block, a boring bar splined in and rotated by the live spindle and adapted to pass through the hollow spindle and chuck, means for operatively connecting and disconnecting the bar and hollow spindle, and means on the boring bar adapted to be engaged by the feed mechanism of the lathe for feeding the boring bar longitudinally.

3. In a lathe, the combination with the head block and tail block, a live spindle in the former, a hollow spindle in the latter, and a chuck carried by one projecting end of this spindle; of means for permitting or for checking rotation of the hollow spindle in its block, a boring bar splined in and rotated by the live spindle and adapted to pass through the hollow spindle and chuck, a lock nut for operatively connecting and disconnecting the bar and hollow spindle, and means on the boring bar adapted to be engaged by the feed mechanism of the lathe for feeding the boring bar longitudinally.

4. In a lathe, the combination with the head block and tail block, a live spindle in the former, a hollow spindle in the latter, and a chuck carried by one projecting end of this spindle; of means for permitting or for checking rotation of the hollow spindle in its block, a boring bar splined in and rotated by the live spindle and adapted to pass through the hollow spindle and chuck, means for operatively connecting and disconnecting the bar and hollow spindle, and a collar adjustable upon the boring bar between the spindles and adapted to be struck by the feeding mechanism of the lathe.

5. In a lathe, the combination with the head block and tail block, a live spindle in the former, a hollow spindle in the latter, and a chuck carried by one projecting end of this spindle; of means for permitting or for checking rotation of the hollow spindle in its block, a boring bar splined in and rotated by the live spindle and adapted to pass through the hollow spindle and chuck, a lock nut for operatively connecting and disconnecting the bar and hollow spindle, and a collar adjustable upon the boring bar between the spindles and adapted to be struck by the feeding mechanism of the lathe.

6. In a lathe, the combination with the head block and tail block, a live spindle in the former, a hollow spindle in the latter, and a chuck carried by one projecting end of this spindle; of a detachable cap plate over the hollow spindle, a screw through the tail block toward said plate for permitting or for checking rotation of the hollow spindle in its block, a boring bar splined in and rotated by the live spindle and adapted to pass through the hollow spindle and chuck, a lock nut for operatively connecting and disconnecting the bar and hollow spindle, and a collar adjustable upon the boring bar between the spindles and adapted to be struck by the feeding mechanism of the lathe.

7. In a lathe, the combination with the head block and tail block, a live spindle in the former, a dead spindle in the latter, and a chuck carried by one projecting end of this spindle; of means for permitting or for checking rotation of the dead spindle in its block, a boring bar splined in and rotated by the live spindle and adapted to be fed longitudinally, and means for operatively connecting and disconnecting the bar and dead spindle.

8. In a lathe, the combination with the head block and tail block, a live spindle in the former, a dead spindle in the latter with flanges at its extremities, a detachable cap plate removably engaging this spindle between its flanges, and a chuck carried by one projecting end of this spindle; of means for permitting or for checking rotation of the dead spindle in its block, a boring bar splined in and rotated by the live spindle, and adapted to be fed longitudinally, and means for operatively connecting and disconnecting the bar and dead spindle.

9. In a lathe, the combination with the head block and tail block, a live spindle in the former, a dead spindle in the latter with flanges at its extremities, a detachable cap plate removably engaging this spindle between its flanges, and a chuck carried by one projecting end of this spindle; of a screw through the tail block for permitting or for checking rotation of the dead spindle in its block, a boring bar splined in and rotated by the live spindle and adapted to be fed longitudinally, and means for operatively connecting and disconnecting the bar and dead spindle.

10. In a lathe, the combination with a head block and tail block, live and dead spindles located respectively therein, and work-holding mechanism carried by the dead spindle out-board of the tail block; of a collar, an arm supporting it out-board of the tail block and in axial alinement with the dead spindle, a bracket on which said arm is adjustably mounted, a boring bar splined through the live spindle and projecting through the dead spindle and the collar, a tool on said bar, and means for holding the dead spindle in its block.

JAMES N. RUNDLE.

Witnesses:
JOHN S. THEYER,
P. G. DREW.